US011100436B2

(12) United States Patent
Kurian

(10) Patent No.: US 11,100,436 B2
(45) Date of Patent: Aug. 24, 2021

(54) INTELLIGENT DYNAMIC ENTITY DATA CONTROL SYSTEM

(71) Applicant: Bank of America Corporation, Charlotte, NC (US)

(72) Inventor: Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 189 days.

(21) Appl. No.: 16/032,111

(22) Filed: Jul. 11, 2018

(65) Prior Publication Data

US 2020/0019897 A1 Jan. 16, 2020

(51) Int. Cl.
| | |
|---|---|
| *G06Q 10/00* | (2012.01) |
| *G06Q 40/00* | (2012.01) |
| *G06Q 30/00* | (2012.01) |
| *G06N 20/00* | (2019.01) |
| *G06Q 10/06* | (2012.01) |
| *G06Q 30/02* | (2012.01) |

(52) U.S. Cl.
CPC ......... *G06Q 10/0631* (2013.01); *G06N 20/00* (2019.01); *G06Q 30/0205* (2013.01); *G06Q 40/125* (2013.12)

(58) Field of Classification Search
CPC ...................................................... G06N 20/00
USPC .............................................. 705/7.11–7.42
See application file for complete search history.

(56) References Cited

U.S. PATENT DOCUMENTS

| | | | |
|---|---|---|---|
| 8,219,535 B1 * | 7/2012 | Kobori | G06F 16/29 707/694 |
| 8,538,864 B2 | 9/2013 | Von Der Emde et al. | |
| 9,508,082 B1 * | 11/2016 | Mannix | G06Q 30/0205 |
| 9,613,190 B2 | 4/2017 | Ford et al. | |
| 9,645,712 B2 | 5/2017 | Bhandarkar et al. | |
| 9,811,790 B2 | 11/2017 | Ahern et al. | |
| 9,898,767 B2 | 2/2018 | Psota et al. | |
| 9,922,345 B2 | 3/2018 | Mikurak | |
| 10,452,992 B2 * | 10/2019 | Lee | G06N 20/00 |
| 2012/0257786 A1 * | 10/2012 | Camper | G06Q 10/10 382/100 |
| 2015/0331903 A1 * | 11/2015 | Blanco | G06F 3/0484 707/766 |
| 2016/0343013 A1 * | 11/2016 | Press | G06Q 30/0207 |

(Continued)

*Primary Examiner* — Alan S Miller
*Assistant Examiner* — Mustafa Iqbal
(74) *Attorney, Agent, or Firm* — Banner & Witcott, Ltd.; Michael A. Springs

(57) ABSTRACT

Systems for dynamic entity data control are provided. In some examples, a system may receive a request to generate a recommendation for a second region or area for the entity to operate and/or a request for a second entity to house the entity during operating in the second region or area. The system may generate and transmit requests for additional data. The requests for additional data may include requests for data about the entity, as well as requests for data about a plurality of other entities, other regions or areas, and the like. Response data may be received by the system and may be analyzed using machine learning. Once the recommendation has been generated, one or more instructions may be generated and transmitted to an entity computing system, a computing system of the second or temporary entity, or the like. The generated instruction may then be executed to modify data, display additional or new data, or the like.

21 Claims, 14 Drawing Sheets

(56) References Cited

U.S. PATENT DOCUMENTS

| | | |
|---|---|---|
| 2017/0221072 A1 | 8/2017 | AthuluruTlrumala et al. |
| 2018/0068252 A1 | 3/2018 | Guicciardi |
| 2018/0107731 A1 | 4/2018 | Ducott, III et al. |
| 2018/0107957 A1 | 4/2018 | Jambor-Sadeghi |
| 2019/0188614 A1* | 6/2019 | Ferranti ............. G06Q 10/0635 |

* cited by examiner

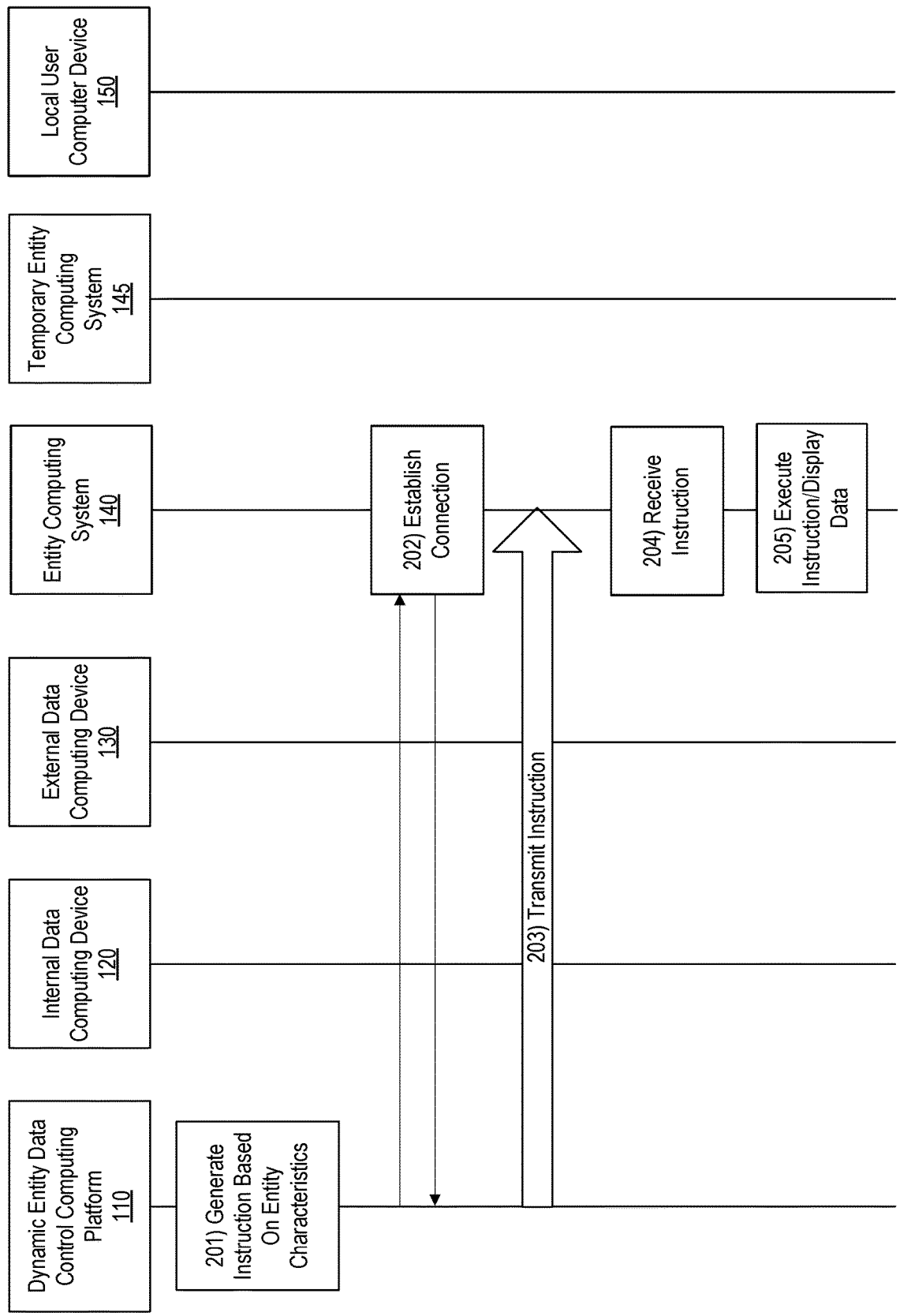

```
┌─────────────────────────────────────────────────┐
│              CONTACT THE ENTITY            400  │
│                                                 │
│  402 ── WE ARE LOCATED AT 1234 MAIN STREET      │
│                ANYWHERE, USA                    │
│                                                 │
│         OUR ASSOCIATES ARE READY TO ASSIST      │
│                       YOU                       │
│                                                 │
│      HOURS:          MONDAY: 8-5                │
│                      TUESDAY: 8-5               │
│                      WEDNESDAY: 8-7             │
│                      THURSDAY: 8-5              │
│                      FRIDAY: 8-5                │
│                      SATURDAY: 8-1              │
│                      SUNDAY: CLOSED             │
│                                                 │
└─────────────────────────────────────────────────┘
```

FIG. 4A

```
┌─────────────────────────────────────────────────┐
│                                            450  │
│              CONTACT THE ENTITY                 │
│                                                 │
│              WE ARE LOCATED AT:                 │
│         452 ── 1234 MAIN STREET                 │
│                CITY 1, USA                      │
│                                                 │
│         VISIT OUR SECOND LOCATION AT:           │
│         454 ── 5678 SMITH STREET                │
│                CITY 2, USA                      │
│                                                 │
│         OUR ASSOCIATES ARE READY TO ASSIST      │
│                       YOU                       │
│      HOURS:          MONDAY: 8-5                │
│                      TUESDAY: 8-5               │
│                      WEDNESDAY: 8-7             │
│                      THURSDAY: 8-5              │
│                      FRIDAY: 8-5                │
│                      SATURDAY: 8-1              │
│                      SUNDAY: CLOSED             │
│                                                 │
└─────────────────────────────────────────────────┘
```

FIG. 4B

INTELLIGENT DYNAMIC ENTITY DATA CONTROL SYSTEM

BACKGROUND

Aspects of the disclosure relate to electrical computers, systems, and machine learning. In particular, one or more aspects of the disclosure relate to using machine learning to determine recommendations for regions and/or entities that can house or accommodate another entity for a temporary period of time.

Relocating a business to another location, and/or establishing a second or additional location for a business in a different geographic location can be costly and can include many risks. In particular, if a business or entity desires to relocate for a temporary time period, it may be cost-prohibitive to establish a brick and mortar location in a new region or city, hire employees, establish computing resources, and the like. Accordingly, it may be advantageous to engage with a second entity, currently operating in the desired area or region, and use the resources of the second entity to establish a location in the area or region, without requiring relocation of the entity, renting or purchasing commercial space, hiring employees, and the like.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with identifying a second entity or location for the entity to operate, engaging the second entity, executing instructions to accommodate or facilitate operation of the entity via the second entity, and the like.

In some examples, a system, computing platform, or the like, may execute at least a first instruction. Executing the at least a first instruction may include generating or modifying data to appear on a website, and the like. The system, computing platform, or the like, may receive a request to generate a recommendation for a second region or area for the entity to operate and/or a request for a second entity to house the entity during operating in the second region or area.

Responsive to receiving the request, the system, computing platform, or the like, may activate one or more functions and may generate and transmit requests for additional data. The requests for additional data may include requests for data about the entity, as well as requests for data about a plurality of other entities, other regions or areas, and the like.

Response data may be received by the system, computing platform, or the like, and may be analyzed using machine learning. For instance, one or more machine learning datasets may be used to analyze the data and generate a recommendation for one or more of a second entity, a second location, and the like. Once the recommendation has been generated, one or more instructions may be generated and transmitted to an entity computing system, a computing system of the second or temporary entity, or the like. The generated instruction may then be executed to modify data, display additional or new data, or the like.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2H depict an illustrative event sequence for implementing dynamic entity data control functions in accordance with one or more aspects described herein;

FIGS. 4A and 4B illustrate example user interfaces displaying different instructions that have been generated and executed, in accordance with one or more aspects described herein;

DETAILED DESCRIPTION

Figure 1A:
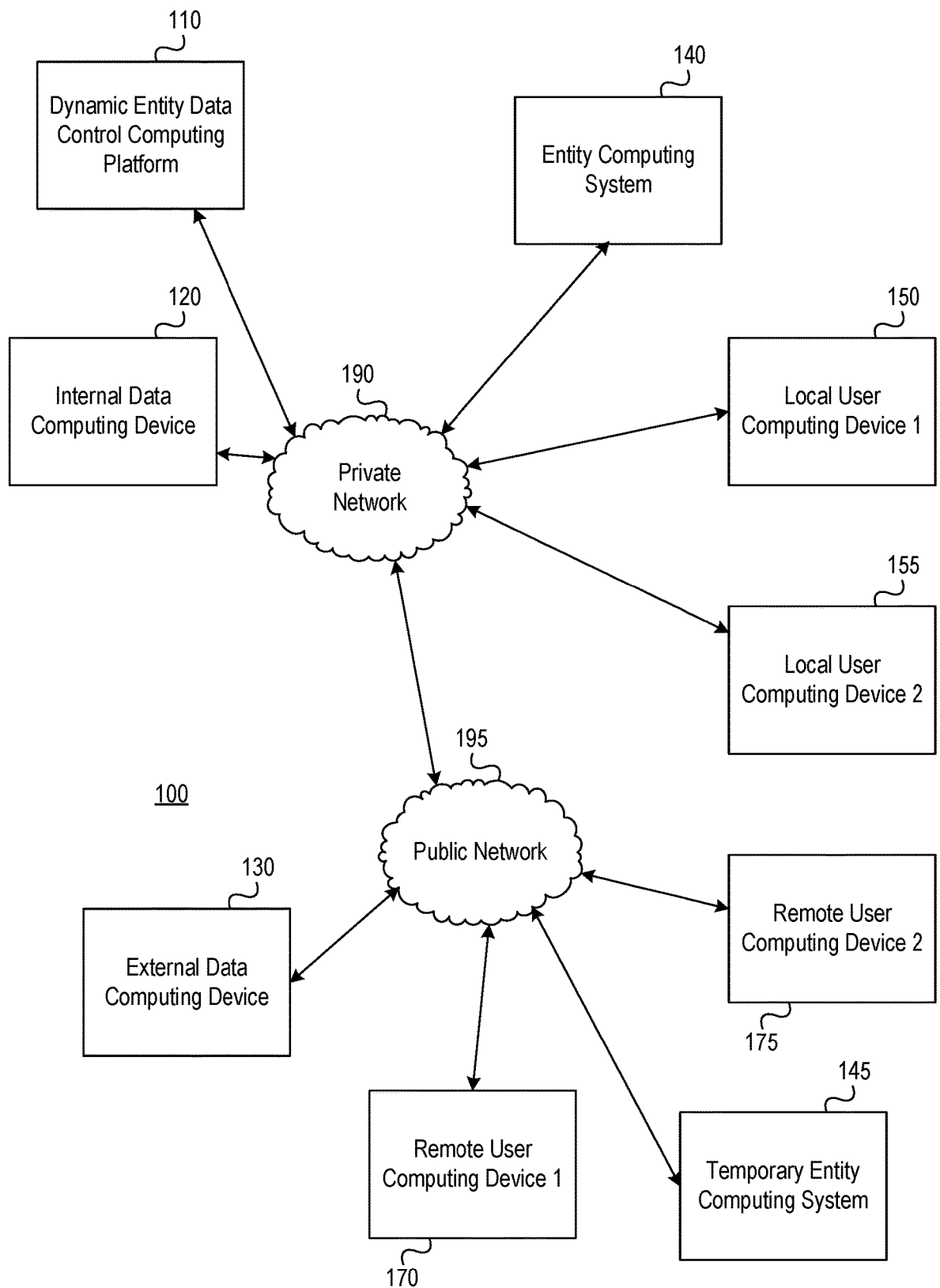
FIGS. 1A and 1B depict an illustrative computing environment for implementing dynamic entity data control functions in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to using machine learning to generate recommendations for a city, region, market, or the like, and/or one or more entities operating in the city, region, market or the like, to temporarily accommodate or house the endeavors of an entity.

As mentioned above, relocating an entity, or adding an additional location of an entity, can be risky and expensive. It may require obtaining physical space (e.g., a brick and mortar location) from which to operate, purchasing and setting up one or more computer systems, payroll systems, and the like. In some examples, an entity might be looking to have a second location for just a temporary period of time (e.g., for a seasonal business, to evaluate the second location, or the like).

Accordingly, aspects described herein are related to identifying a second entity operating in a second market that may house or accommodate the business of the entity in the second market for a temporary period of time. For instance, aspects described herein are directed to using machine learning to identify a second market, different from a first market in which an entity is currently operating, for the entity to expand (e.g., add an additional location) for a temporary period of time. In some examples, machine learning may also be used to identify a second entity currently operating in the second location to house the operations of the entity for the temporary time period.

For example, an identified second entity may then provide their address and other contact or location information as a location of the entity (e.g., the website of the entity may reflect the first location and the second location, with the second location being an address of the second entity). Further, the second entity may provide resources for use by the entity. For example, employees of the second entity may become employees of the first entity for the temporary time period and may provide the products or services of the first entity from the second location for the temporary time period. Additionally, computer resources and systems of the second entity may be used to support the first entity (e.g., payroll systems, inventory systems, and the like, of the second entity may be used to support the business functions of the first entity).

Once the temporary time period has expired, the entity may disengage from the second entity and all systems and resources may be returned to a state from before the engagement. For instance, modifications to computer systems, employee status, website data, and the like, may be returned to a condition or state from before the time when the second entity began housing the entity.

As discussed, aspects described herein may be performed using machine learning, as well as a series of instructions generated based on the machine learning, to modify data at the entity and/or the second entity, in order to facilitate use of the second entity has a location of the entity. These instructions may be executed to modify data from a first state (e.g., before the entity engages with the second entity) to a second state (e.g., during the temporary time period in which the entity is engaged with the second entity) and back to the first state or other modified state (e.g., upon expiration of the temporary time period).

As will be discussed more fully below, the arrangements described herein enable an entity to seamlessly operating in a new or different market than a current market in which they are operating for a temporary time period with minimal risk. For instance, the temporary use of the resources of the second entity enables the first entity to begin operations in the new market quickly and with minimal investment of time, resources, and the like.

These and various other arrangements will be discussed more fully below.

Figure 1B:
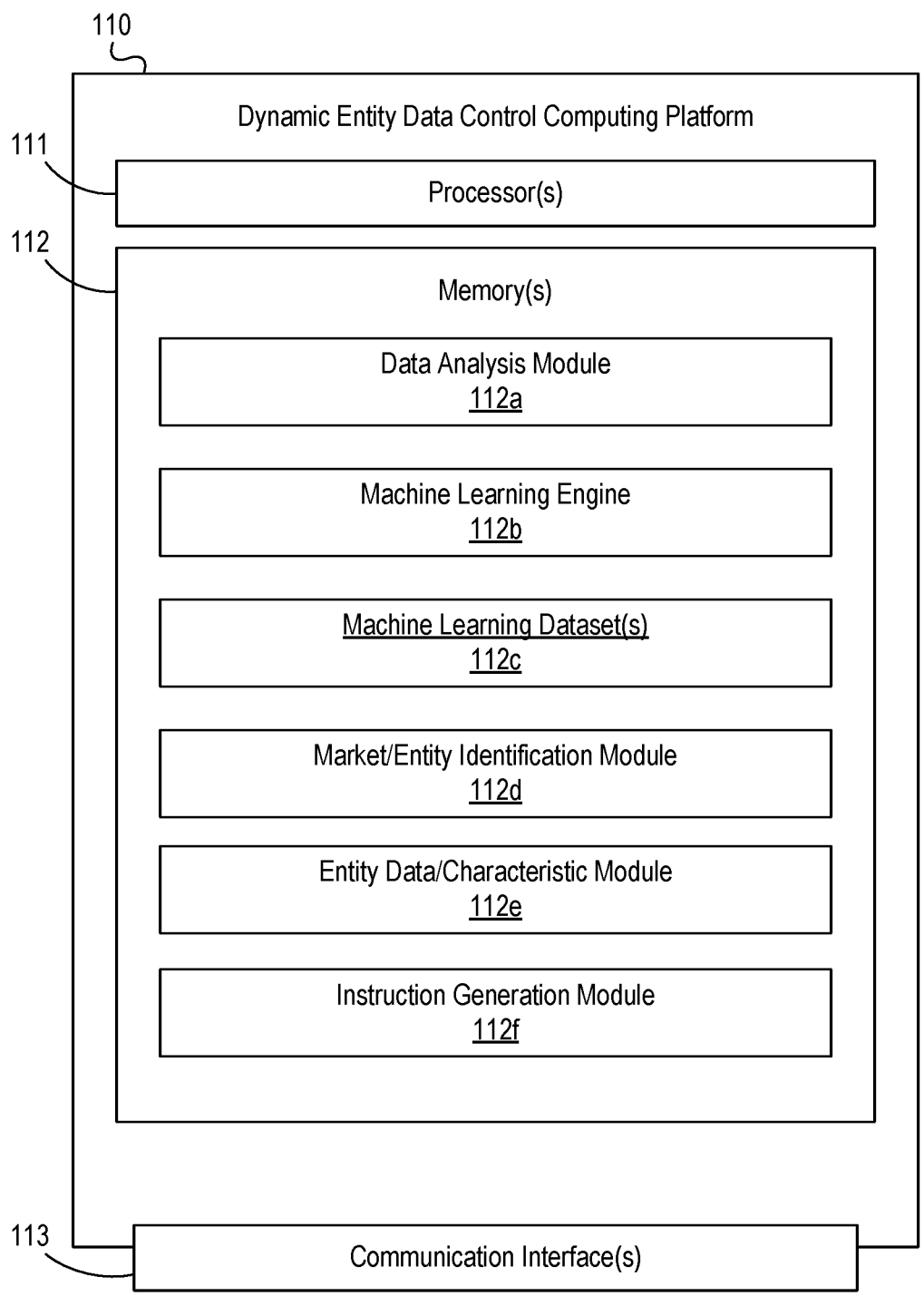

FIGS. 1A and 1B depict an illustrative computing environment for implementing and using a system for intelligent dynamic entity data control in accordance with one or more aspects described herein. Referring to FIG. 1A, computing environment 100 may include one or more computing devices and/or other computing systems. For example, computing environment 100 may include a dynamic entity data control computing platform 110, an internal data computing device 120, an external data computing device 130, an entity computing system 140, a temporary entity computing system 145, a first local user computing device 150, a second local user computing device 155, a first remote user computing device 170, and a second remote user computing device 175.

Dynamic entity data control computing platform 110 may be configured to host and/or execute a machine learning engine to provide intelligent entity data control functions. In some examples, data may be received from one or more sources, such as internal data computing device 120, external data computing device 130, or the like. The data may include data related to a first market (e.g., city, state, region, or the like) in which an entity is operating, as well as one or more other markets. In some examples, the entity might not be operating, or may have limited operations, in the one or more other markets.

The data may be analyzed using one or more machine learning datasets generated by a machine learning engine to identify at least a second market recommendation. The second market recommendation may include a recommendation for a second market into which the entity may expand on a temporary basis. For instance, if, for example, the entity provides seasonal services (e.g., pool cleaning, snow removal, or the like) the system may identify at least a second market in which the entity should begin temporary operations for the appropriate season.

Upon identifying the at least a second market, the dynamic entity data control computing platform 110 may identify one or more second entities to accommodate the first entity for the temporary period (e.g., a second entity to provide resources, an office, and the like. In some examples, the second entity may maintain their current business functions in addition to facilitating the business functions of the first entity). In some examples, machine learning may be used to identify the one or more second entities. As discussed more fully herein, accommodating the first entity may include provide a physical location or workspace, providing an actual address that may be publicized by the first entity (e.g., on a website, or the like), providing one or more employees or other aspects of a workforce, as well as providing one or more other resources for use by the first entity during the temporary period. Accordingly, the one or more second entities may enable the first entity to conduct business in the second market and establish the business relatively quickly without securing work space, hiring workers, etc. as a traditional entity expansion would entail.

The dynamic entity data control computing platform 110 may then generate and/or execute one or more instructions causing modification of one or more systems, such as entity computing system 140, temporary entity computing system 145, or the like. In some examples, the instructions may include modifications to modify a website of the entity, modify a payroll system or the second entity, modify employment information for one or more employees of the second entity, or the like. In some examples, the instruction may include filtering, segmenting, compartmentalizing, or the like, data to ensure that sensitive data of one entity is not accessible by employees of the other entity, while still permitting access to certain type of data that may be necessary or useful in facilitating operations of the entity at the second entity.

Internal data computing device 120 may be configured to store, transmit, and/or receive data associated with one or more internal data or computer systems. For instance, an entity implementing the dynamic entity data control computing platform 110 may store data associated with various users, with one or more entity characteristics, with one or more products or services provided by the entity, and the like. This information may be used to generate, update and/or validate one or more machine learning datasets, generate a recommended second market, generate a recommended second entity, or the like.

External data computing device 130 may be configured to store, transmit, and/or receive data associated with one or more data or computer systems external to the entity implementing the dynamic entity data control computing platform 110. For instance, data, such as publicly available data, transaction data, user demographic data, social media data, market data, and the like, may be transmitted, via the external data computing device 130, from one or more data or computer systems, to the dynamic entity data control computing platform 110 and may be used to generate, update and/or validate one or more machine learning datasets, generate a recommended second market, generate a recommended second entity, and the like.

Entity computing system 140 may include one or more computing devices, servers, or the like, that may execute instructions to control one or more aspects of an entity's practices. For instance, the entity computing system 140 may control or execute a payroll system for the entity, may control or execute a website for the entity, may control or execute billing processes for the entity, may control or execute inventor processes for the entity, and the like.

Temporary entity computing system 145 may include one or more computing devices, servers, or the like, that may execute instructions to control one or more aspects of a second entity's practices. For instance, the entity computing system 140 may control or execute a payroll system for the second entity, may control or execute a website for the second entity, may control or execute billing processes for the second entity, may control or execute inventory processes for the second entity, and the like.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to control or implement aspects of the functions performed by dynamic entity data control computing platform 110, to receive user input modifying aspects of the entity's characteristics (e.g., modify content on a website, or the like), and the like.

The remote user computing devices 170, 175 may be used to communicate with, for example, dynamic entity data control computing platform 110, receive and display notifications or other data, and the like.

In one or more arrangements, internal data computing device 120, external data computing device 130, entity computing system 140, temporary entity computing system 145, local user computing device 150, local user computing device 155, remote user computing device 170, and/or remote user computing device 175 may be any type of computing device or combination of devices capable of performing the particular functions described herein. For example, internal data computing device 120, external data computing device 130, entity computing system 140, temporary entity computing system 145, local user computing device 150, local user computing device 155, remote user computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of internal data computing device 120, external data computing device 130, entity computing system 140, temporary entity computing system 145, local user computing device 150, local user computing device 155, remote user computing device 170, and/or remote user computing device 175 may, in some instances, be special-purpose computing devices configured to perform specific functions.

Computing environment 100 also may include one or more computing platforms. For example, and as noted above, computing environment 100 may include dynamic entity data control computing platform 110. As illustrated in greater detail below, dynamic entity data control computing platform 110 may include one or more computing devices configured to perform one or more of the functions described herein. For example, dynamic entity data control computing platform 110 may include one or more computers (e.g., laptop computers, desktop computers, servers, server blades, or the like).

As mentioned above, computing environment 100 also may include one or more networks, which may interconnect one or more of dynamic entity data control computing platform 110, internal data computing device 120, external data computing device 130, entity computing system 140, temporary entity computing system 145, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, dynamic entity data control computing platform 110, internal data computing device 120, entity computing system 140, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect dynamic entity data control computing platform 110, internal data computing device 120, entity computing system 140, local user computing device 150, and local user computing device 155, and one or more other computing devices and/or computer systems that are used by, operated by, and/or otherwise associated with the organization. Public network 195 may connect private network 190 and/or one or more computing devices connected thereto (e.g., dynamic entity data control computing platform 110, internal data computing device 120, entity computing system 140, local user computing device 150, local user computing device 155) with one or more networks and/or computing devices that are not associated with the organization. For example, external data computing device 130, temporary entity computing system 145, remote user computing device 170, and/or remote user computing device 175 might not be associated with an organization that operates private network 190 (e.g., because external data computing device 130, temporary entity computing system 145, remote user computing device 170 and remote user computing device 175 may be owned, operated, and/or serviced by one or more entities different from the organization that operates private network 190, such as a second entity different from the entity, one or more customers of the organization, public or government entities, and/or vendors of the organization, rather than being owned and/or operated by the organization itself or an employee or affiliate of the organization), and public network 195 may include one or more networks (e.g., the internet) that connect external data computing device 130, temporary entity computing system 145, remote user computing device 170 and remote user computing device 175 to private network 190 and/or one or more computing devices connected thereto (e.g., dynamic entity data control computing platform 110, internal data computing device 120, entity computing system 140, local user computing device 150, local user computing device 155).

Referring to FIG. 1B, dynamic entity data control computing platform 110 may include one or more processors 111, memory 112, and communication interface 113. A data bus may interconnect processor(s) 111, memory 112, and communication interface 113. Communication interface 113 may be a network interface configured to support communication between dynamic entity data control computing platform 110 and one or more networks (e.g., private network 190, public network 195, or the like). Memory 112 may include one or more program modules having instructions that when executed by processor(s) 111 cause dynamic entity data control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of dynamic entity data control computing platform 110 and/or by different computing devices that may form and/or otherwise make up dynamic entity data control computing platform 110.

For example, memory 112 may have, store, and/or include a data analysis module 112a. Data analysis module 112a may store instructions and/or data that may cause or enable the dynamic entity data control computing platform 110 to receive data from one or more sources, such as internal data computing device 120, external data computing device 130, and/or other similar devices providing both internal and/or external data. The data received may include internal data such as performance metrics for the entity, strong performing regions or markets, weaker performing regions or markets, current campaigns for new business, data related to products and services offered, and the like. In some examples, the data received may include external data such as market demographic information for a plurality of different markets, competitive data, pricing data, and the like. The external data may, in some arrangements, include data associated with one or more other entities different from the entity and operating in one or more markets other than the market(s) in which the entity is operating.

The data analysis module 112a may analyze the data, filter data, perform one or more formatting operations, and the like. The data may then be used by the machine learning engine 112b and one or more machine learning datasets 112c to identify a recommended second market and/or a recommended second or temporary entity.

For instance, the dynamic entity data control computing platform 110 may further have, store, and/or include a machine learning engine 112b and machine learning datasets 112c. Machine learning engine 112b and machine learning datasets 112c may store instructions and/or data that may cause or enable dynamic entity data control computing platform 110 to evaluate analyzed data (e.g., internal data, external data, or the like) to identify a second market different from one or more markets in which the entity is currently operating. In some examples, the machine learning engine 112b and machine learning datasets 112c may store instructions and/or data that may cause or enable dynamic entity data control computing platform 110 to evaluate analyzed data (e.g., internal data, external data, or the like), to identify a second entity to temporarily accommodate or house the entity in the identified second market. The machine learning datasets 112c may be generated based on analyzed data (e.g., data from previously received data, data from internal data computing device 120, data from external data computing device 130, and the like), raw data, and/or received from one or more outside sources.

The machine learning engine 112b may receive data (e.g., data from internal data computing device 120, external data computing device 130, analyzed data from data analysis module 112a, and the like) and, using one or more machine learning algorithms, may generate one or more machine learning datasets 112c. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 112b may analyze data to identify patterns of activity, sequences of activity, and the like, to generate one or more machine learning datasets 112c.

The machine learning datasets 112c may include machine learning data linking one or more entity characteristics, data elements, or the like to one or more second markets, second entities, or the like. In some examples, data associated with sales, profitability, and the like, may be used to identify other cities, regions, markets, or the like, that appear to have a shortage of the services or products provided, as well as to identify one or more other entities to accommodate the entity in the temporary expansion into the other city, region or market. Accordingly, the machine learning datasets 112c may be used to identify a recommended second market and/or entity based on the data associated with the entity.

The machine learning datasets 112c may be updated and/or validated based on subsequent data received, for example, after a second market or entity is identified, after a temporary expansion into the second market or entity, or the like.

The machine learning datasets 112c may be used by, for example, a market/entity identification module 112d. Entity identification module 112d may store instructions and/or data that may cause or enable the dynamic entity data control computing platform 110 to identify one or more other markets, regions, cities or the like, into which the entity should temporarily expand and/or may identify one or more other entities within the identified other market, region, city, or the like, to accommodate the entity's temporary expansion (e.g., provide a physical address, provide workforce resources, or the like).

Dynamic entity data control computing platform 110 may have, store or include an entity data/characteristic module 112e. Entity data/characteristic module 112e may store instructions and/or data that may cause or enable the dynamic entity data control computing platform 110 to identify characteristic data of the entity, as well as characteristic data of the second or other entity. For instance, if the entity is expending to a new market for a temporary period and is going to be housed in the building of the second entity, the entity data/characteristic module 112e may identify address information of the entity, as well as address information of the second entity.

Dynamic entity data control computing platform 110 may have, store and/or include an instruction generation module 112f. Instruction generation module 112f may store instructions and/or data that may cause or enable the dynamic entity data control computing platform 110 to generate and/or execute one or more instructions modifying data elements associated with the entity. For instance, after identifying address information for the entity and the second entity, the instruction generation module 112f may generate an instruction to update a website of the entity with both addresses (e.g., list the permanent location as well as the second, temporary location). The instructions may be transmitted to one or more computing systems or devices and may be executed to modify the data elements.

FIGS. 2A-2F depict an illustrative event sequence for implementing and using dynamic entity data control functions in accordance with one or more aspects described herein. The events shown in the illustrative event sequence are merely one example sequence and additional events may be added, or events may be omitted, without departing from the invention.

Referring to FIG. 2A, at step 201, an instruction may be generated by the dynamic entity data control computing platform 110. For instance, one or more instructions may be generated based on one or more characteristics of the entity. In some examples, the instructions may include data for display on a website, for distribution via one or more channels of distribution associated with the entity, and the like. For instance, the one or more instructions generated may be data for display on a website that may include contact information, address information of a physical location of the entity, and the like. In some arrangements, the instruction may be generated on a periodic or on demand basis (e.g., the dynamic entity data control computing platform 110 may, on a periodic or aperiodic basis, scan one or more systems to identify characteristics of the entity and may generate instructions based on the identified characteristics).

At step 202, a connection may be established between the dynamic entity data control computing platform 110 and one or more entity computing systems 140. For instance, a first wireless connection may be established between the dynamic entity data control computing platform 110 and the one or more entity computing systems 140. Upon establishing the wireless connection, a communication session may be initiated between the dynamic entity data control computing platform 110 and the one or more entity computing systems 140.

At step 203, the instruction generated in step 201 may be transmitted to the one or more entity computing systems 140. At step 204, the transmitted instruction may be received by the one or more entity computing systems 140 and, at step 205, the instruction may be executed. In some examples, executing the instruction may include modifying, displaying or causing to display one or data elements based on the generated instruction.

Figure 2B:
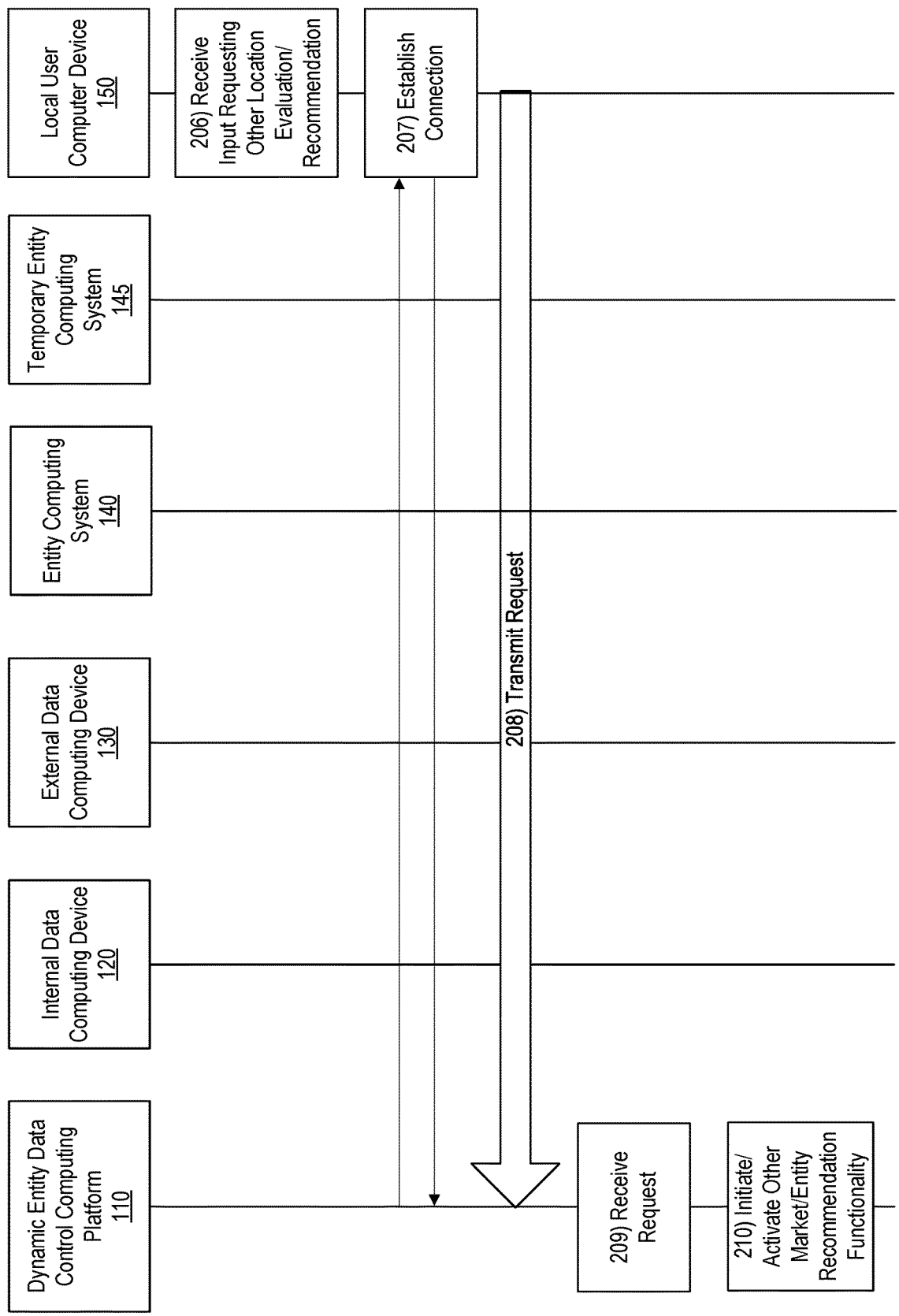

With reference to FIG. 2B, at step 206, input requesting a second or other (and, in some examples, temporary) location recommendation for the entity may be received. For instance, one or more local user computing devices 150, 155, may receive user input requesting a recommendation for a second or other location (e.g., market, second entity, and the like) evaluation and/or recommendation.

At step 207, a connection may be established between the dynamic entity data control computing platform 110 and the local user computing device 150 at which the request/user input was received. For instance, a second wireless connection may be established between the dynamic entity data control computing platform 110 and the local user computing device 150. Upon establishing the second wireless connection, a communication session may be initiated between the dynamic entity data control computing platform 110 and the local user computing device 150.

At step 208, the request and/or user input may be transmitted from the local user computing device 150 to the dynamic entity data control computing platform 110. At step 209, the request (and any accompanying data) may be received by the dynamic entity data control computing platform 110.

At step 210, one or more other market/entity recommendation functions may be activated and/or initiated. For instance, responsive to receiving the request, the dynamic entity data control computing platform 110 may activate or initiate one or more functions associated with other market and/or entity recommendations. In some examples, activating or initiating the functions may include enabling functions that were disabled when the request was received and are then enabled responsive to the request being received by the dynamic entity data control computing platform 110.

Figure 2C:
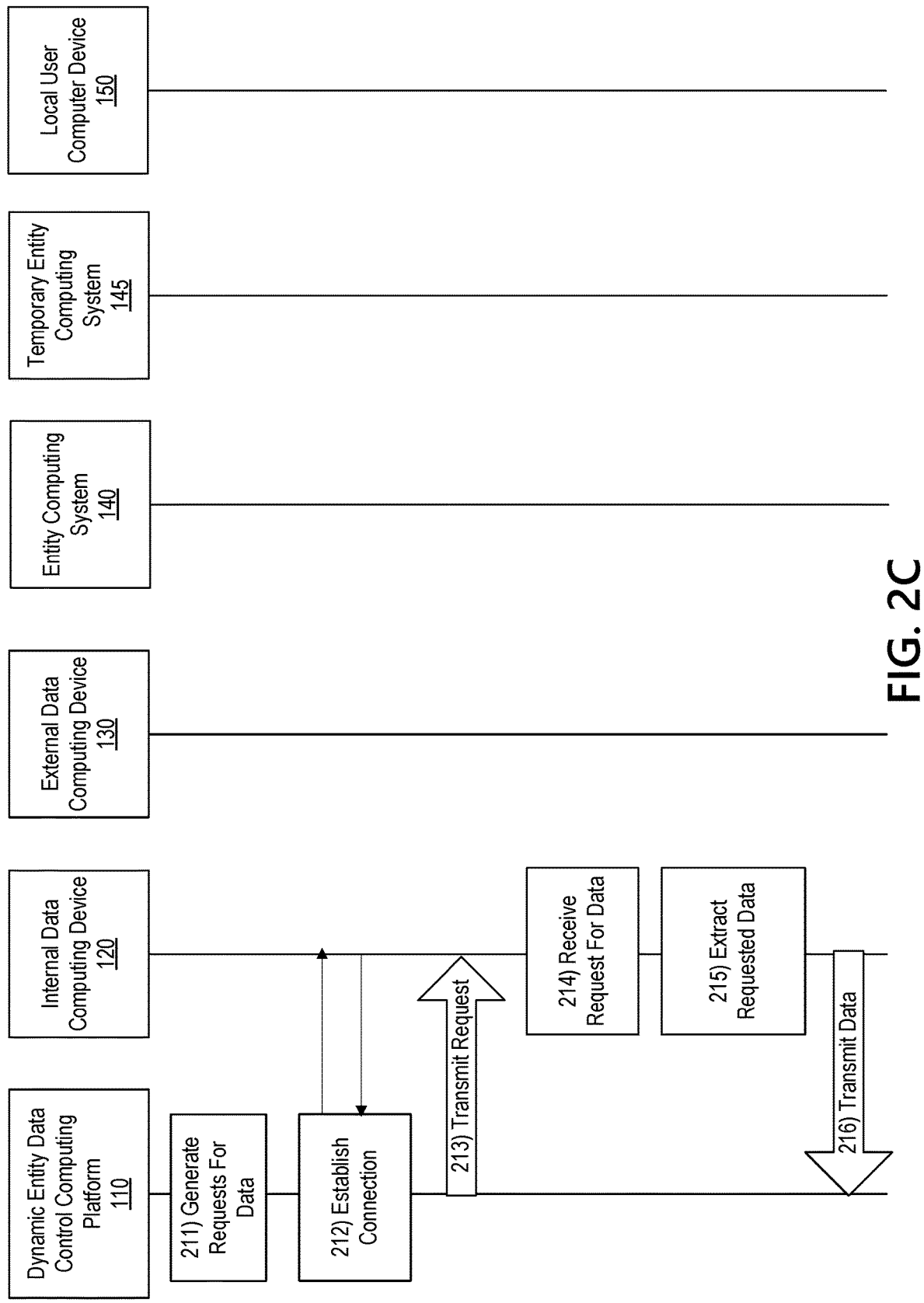

With reference to FIG. 2C, at step 211, one or more requests for data may be generated. For instance, dynamic entity data control computing platform 110 may generate one or more requests for data that may be used in the analysis or evaluation of other markets and/or entities in order to generate a recommendation.

At step 212, a connection may be established between the dynamic entity data control computing platform 110 and internal data computing device 120. For instance, a third wireless connection may be established between the dynamic entity data control computing platform 110 and the internal data computing device 120. Upon establishing the third wireless connection, a communication session may be initiated between the dynamic entity data control computing platform 110 and the internal data computing device 120.

At step 213, the generated request for data may be transmitted to the internal data computing device 120 (e.g., via the third wireless connection and during the communication session). At step 214, the transmitted request may be received by the internal data computing device 120.

At step 215, the requested data may be extracted from one or more data storage locations. For instance, the request may include data associated with entity financial performance, historical performance data, products and/or services having higher than expected performance or performance identified as high, and the like. Various other types of data may be requested without departing from the invention. Accordingly, the requested data or types of data may be extracted from one or more data storage locations in internal data computing device 120.

At step 216, the extracted data may be transmitted from the internal data computing device 120 to the dynamic entity data control computing platform 110 (e.g., via the third wireless connection and during the communication session). For instance, response data including the extracted data may be transmitted to the dynamic entity data control computing platform 110.

Figure 2D:
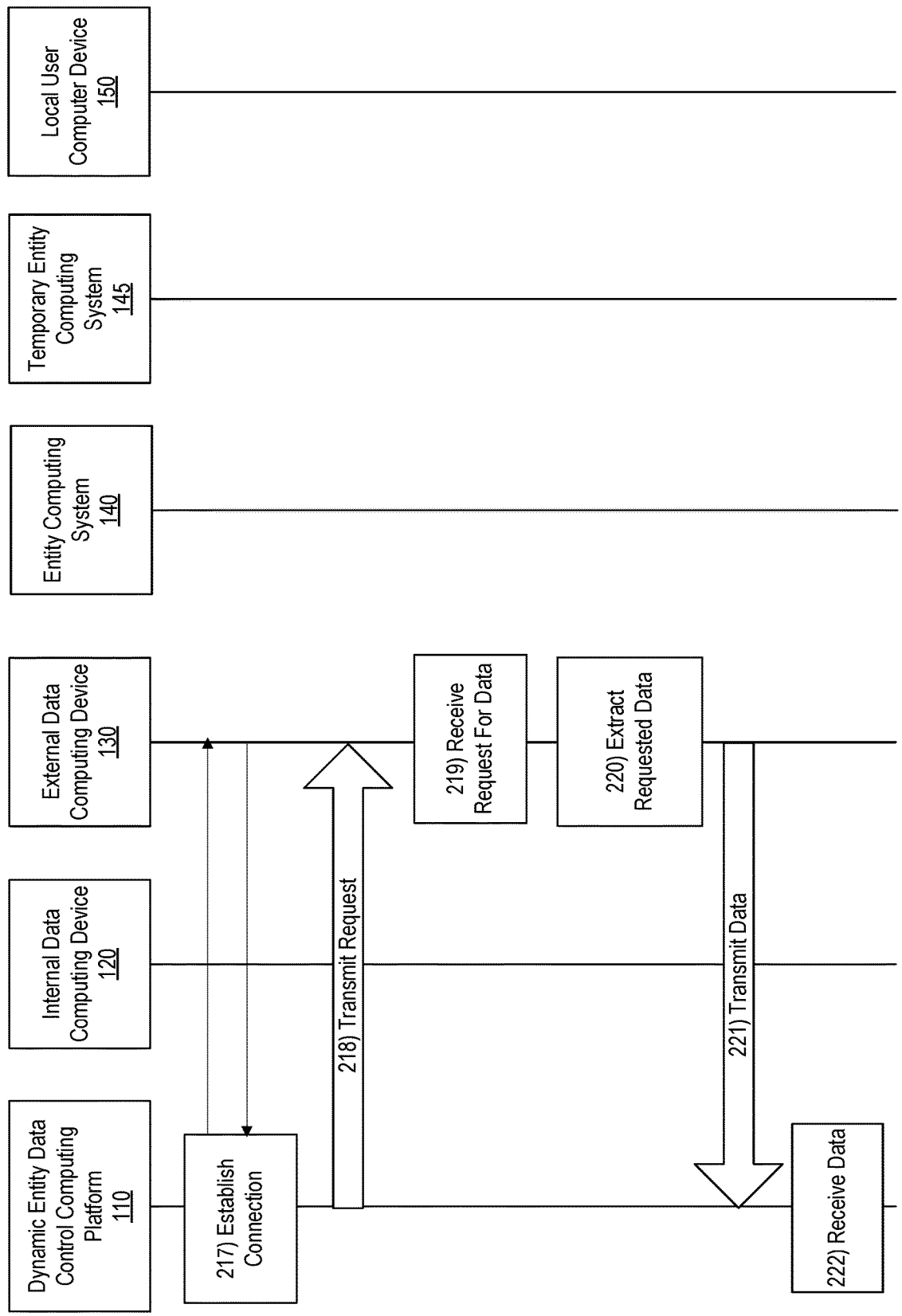

With reference to FIG. 2D, at step 217, a connection may be established between the dynamic entity data control computing platform 110 and external data computing device 130. For instance, a fourth wireless connection may be established between the dynamic entity data control computing platform 110 and the external data computing device 130. Upon establishing the fourth wireless connection, a communication session may be initiated between the dynamic entity data control computing platform 110 and the external data computing device 130.

At step 218, the generated request for data may be transmitted from the dynamic entity data control computing platform 110 to the external data computing device 130 (e.g., via the fourth wireless connection and during the communication session). The generated request may include a request for information associated with one or more markets, regions, locations, or the like, one or more entities operating in those markets, regions, locations, and the like, data associated with products and services sold or provided in the markets, regions, locations, or the like, and the like. Various other data may be requested without departing from the invention.

At step 220, the requested data may be extracted from one or more data storage locations of the external data computing device 130. At step 221, the extracted data may be transmitted from the external data computing device 130 to the dynamic entity data control computing platform 110 (e.g., via the fourth wireless connection and during the communication session). For instance, response data may be transmitted to the dynamic entity data control computing platform 110.

At step 222, the data may be received by the dynamic entity data control computing platform 110.

Figure 2E:
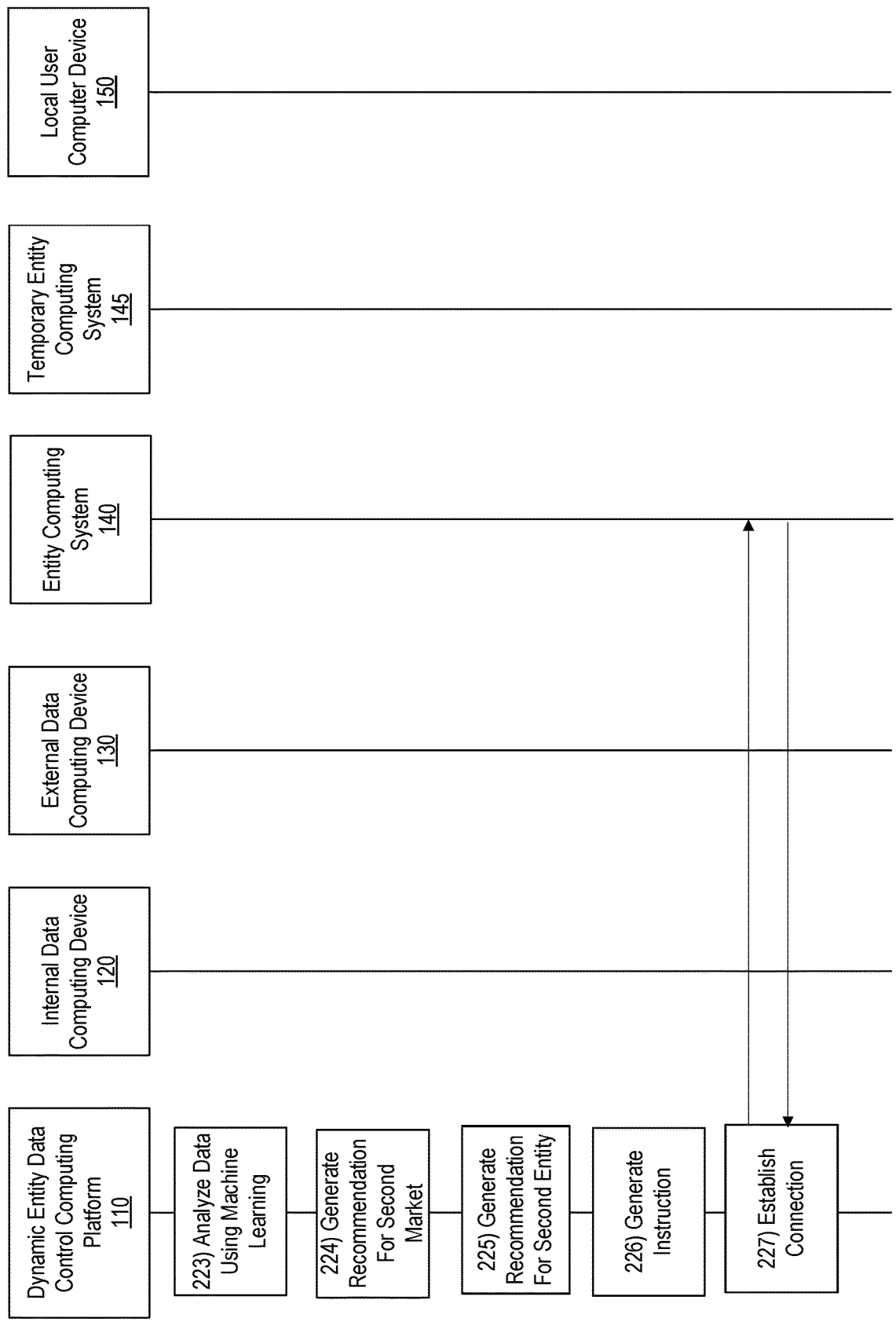

With reference to FIG. 2E, at step 223, the dynamic entity data control computing platform 110 may analyze the received data and request (and any accompanying data). In some examples, the analysis may be performed using machine learning. For instance, one or more machine learning datasets and the machine learning engine may be used to evaluate and/or analyze the data to generate one or more recommendations.

At step 224, based on the analysis performed using machine learning, the dynamic entity data control computing platform 110 may generate a recommendation for one or more second markets in which the entity may operate. As discussed herein, the one or more second markets may include a city, region, location, or the like, in which the entity is not currently operating or is operating on a limited basis (e.g., not providing all goods or services). In at least some examples, the second market may be a market in which the entity may operate for a temporary or limited time period (e.g., seasonally, until long term plans are finalized, for testing purposes, or the like).

At step 225, based on the analysis performed using machine learning, the dynamic entity data control computing platform 110 may generate a recommendation for a second entity. For instance, the dynamic entity data control computing platform 110 may generate a recommendation for a second entity that is currently operating in the recommended at least one second market and that can accommodate or house (e.g., temporarily) the entity while it operates in the at least one second market. In some examples, the second entity may be an entity having resources sufficient to accommodate the entity, such as personnel, payroll systems, internal computing systems, and the like.

At step 226, one or more instructions may be generated. For instance, the dynamic entity data control computing platform 110 may generate one or more instructions to modify data, generate and/or display new, additional or different data, and the like, based on the recommendations generated for the at least one second market and the second entity.

At step 227, a connection may be established between the dynamic entity data control computing platform 110 and entity computing system 140. For instance, a fifth wireless connection may be established between the dynamic entity data control computing platform 110 and the entity computing system 140. Upon establishing the fifth wireless connection, a communication session may be initiated between the dynamic entity data control computing platform 110 and the entity computing system 140.

Figure 2F:
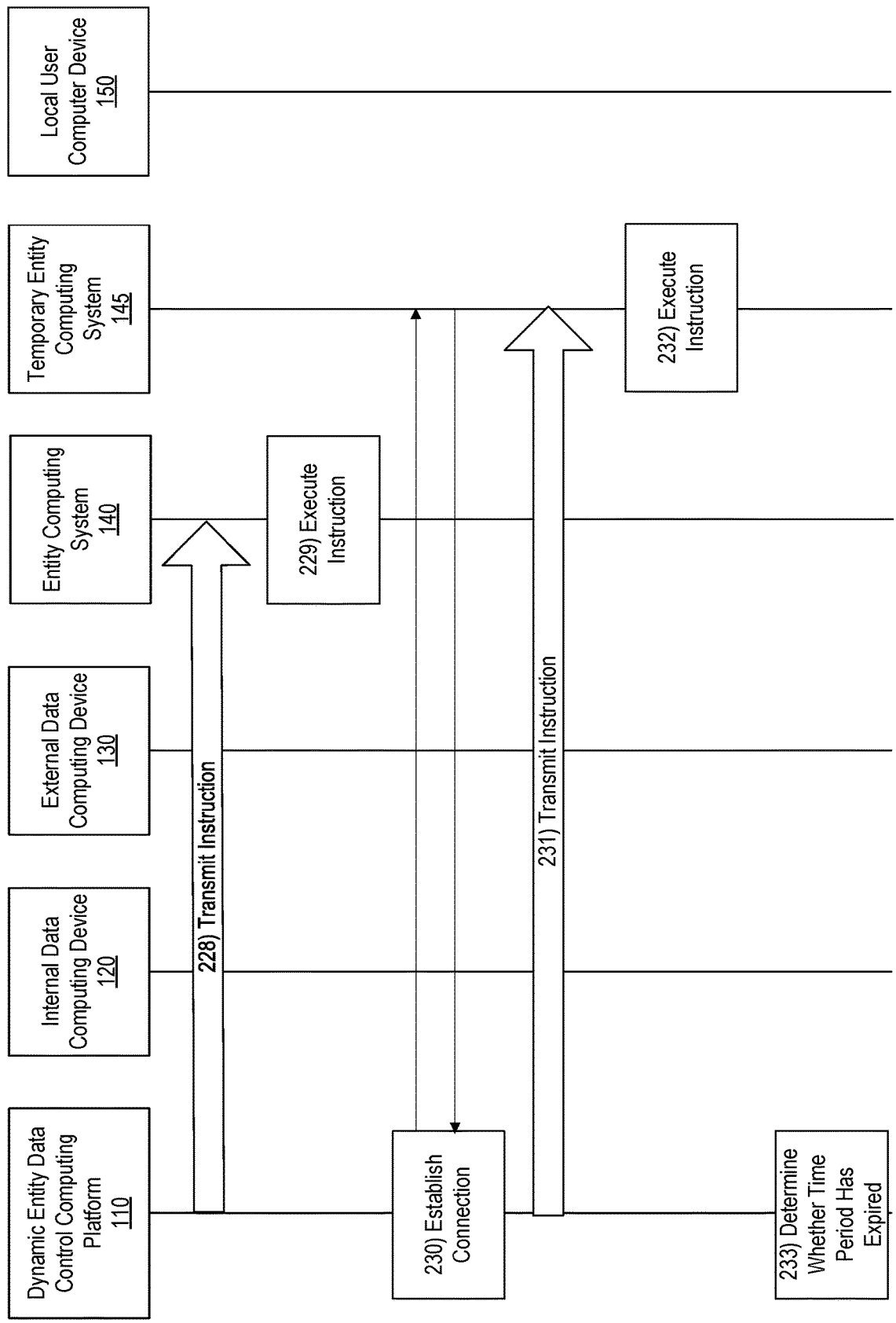

With reference to FIG. 2F, at step 228, one or more of the generated instructions may be transmitted from the dynamic entity data control computing platform 110 to the entity computing system 140. For instance, one or more of the generated instructions may be transmitted via the fifth wireless connection and during the communication session. In some examples, the instructions may include modifications to data associated with a website (e.g., display of address information, contact information, location information, and the like) to reflect the characteristics of the second entity through which the entity will be operating in the at least a second market. Various other instructions may also be transmitted without departing from the invention.

At step 229, the instruction(s) may be received by the entity computing system 140 and may be executed by the entity computing system 140. For instance, instructions to modify or add additional or new data to a website may be executed by the entity computing system 140 and the website associated with the entity may be updated accordingly to reflect the modified information.

At step 230, a connection may be established between the dynamic entity data control computing platform 110 and second or temporary entity computing system 145. For instance, a sixth wireless connection may be established between the dynamic entity data control computing platform 110 and the second or temporary entity computing system 145. Upon establishing the sixth wireless connection, a communication session may be initiated between the dynamic entity data control computing platform 110 and the second or temporary entity computing system 145.

At step 231, one or more of the generated instructions may be transmitted from the dynamic entity data control computing platform 110 to the second or temporary entity computing system 145. For instance, one or more of the generated instructions may be transmitted via the sixth wireless connection and during the communication session. In some examples, the instructions may include modifications to data associated with systems of the second entity, such as payroll, computing resources, inventory resources, marketing resources, and the like. Various other instructions may be transmitted without departing from the invention.

At step 232, the instruction(s) may be received by the second or temporary entity computing system 145 and may be executed by the second or temporary entity computing system 145. For instance, instructions to modify systems of the second or temporary entity to facilitate housing or accommodating the entity for the temporary period may be executed and the appropriate systems may be modified to reflect the changes.

As discussed herein, the entity may operate in the recommended second market via the second entity. However, the entity may desire to operate in the second market and via the second entity for a temporary period. Accordingly, after expiration of the time period, the entity may desire to cease operating in the second market and via the second entity.

Accordingly, at step 233, a determination may be made as to whether a time period has expired. For instance, the generated recommendation may include operation on the second market and via the second entity for a predetermined time period (e.g., for a temporary period). The dynamic entity data control computing platform 110 may continuously scan to determine whether the time period has lapsed or expired. If not, the dynamic entity data control computing platform 110 may continue to scan.

Figure 2G:
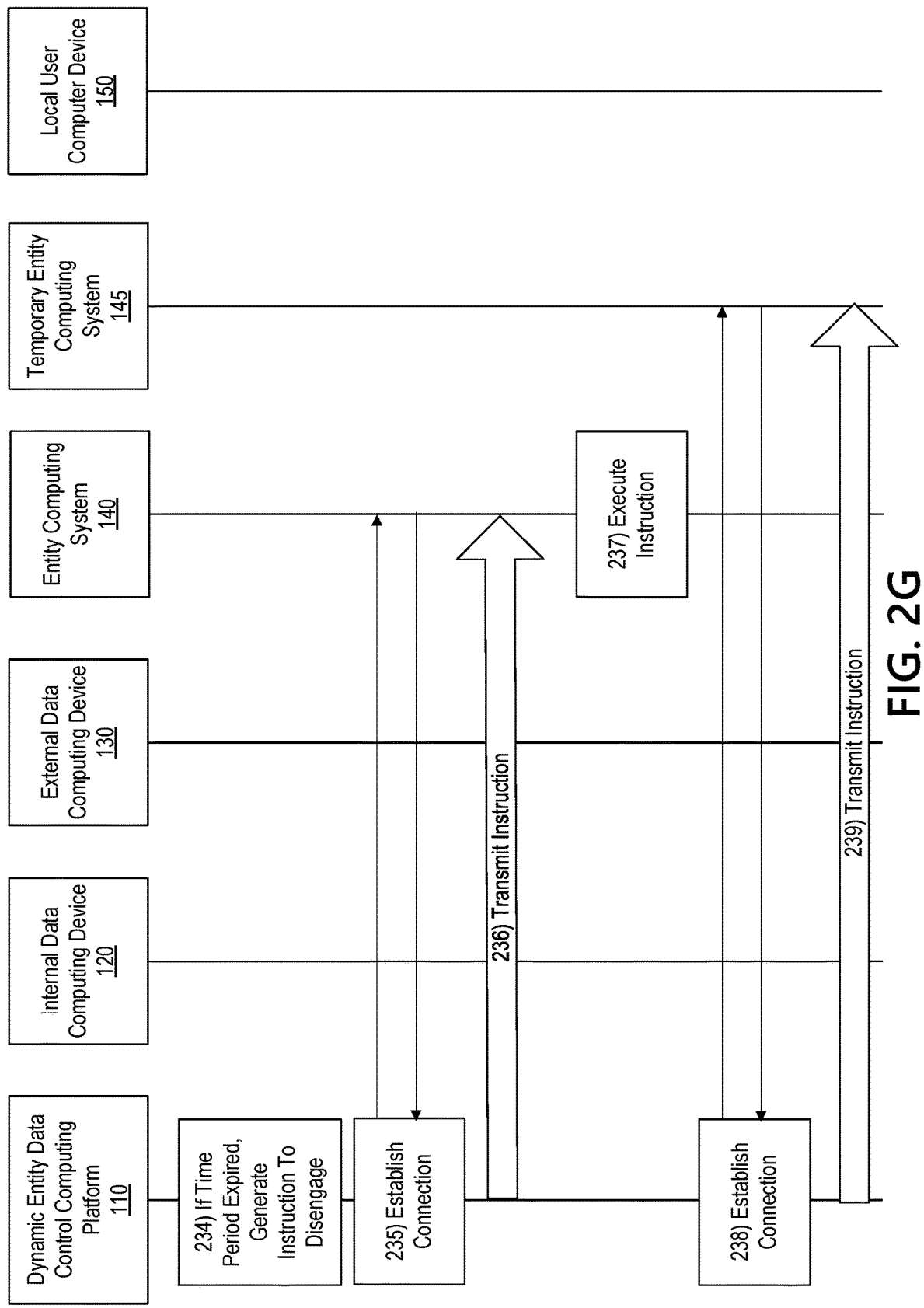

Alternatively, with reference to FIG. 2G, if the time period has lapsed or expired, at step 234, an instruction to disengage the entity from the second entity or second market may be generated. For instance, an instruction may be generated to modify data to reinstate data that was previously displayed (e.g., before second instructions were executed), replace data, display new or additional data, or the like.

At step 235, a connection may be established between the dynamic entity data control computing platform 110 and entity computing system 140. For instance, a seventh wireless connection may be established between the dynamic entity data control computing platform 110 and the entity computing system 140. Upon establishing the seventh wireless connection, a communication session may be initiated between the dynamic entity data control computing platform 110 and the entity computing system 140.

At step 236, the generated instruction to disengage the entity from the second entity or market may be transmitted to the entity computing system 140. For instance, via the seventh wireless connection and during the communication session, the generated instruction may be transmitted to the entity computing system 140. At step 237, the instruction may be received and executed.

At step 238, a connection may be established between the dynamic entity data control computing platform 110 and second or temporary entity computing system 145. For instance, an eight wireless connection may be established between the dynamic entity data control computing platform 110 and the second or temporary entity computing system 145. Upon establishing the eight wireless connection, a communication session may be initiated between the dynamic entity data control computing platform 110 and the second or temporary entity computing system 145.

At step 239, the generated instruction to disengage the entity from the second entity or market may be transmitted to the second or temporary entity computing system 145. For instance, via the eight wireless connection and during the communication session, the generated instruction may be transmitted to the second or temporary entity computing system 145.

Figure 2H:
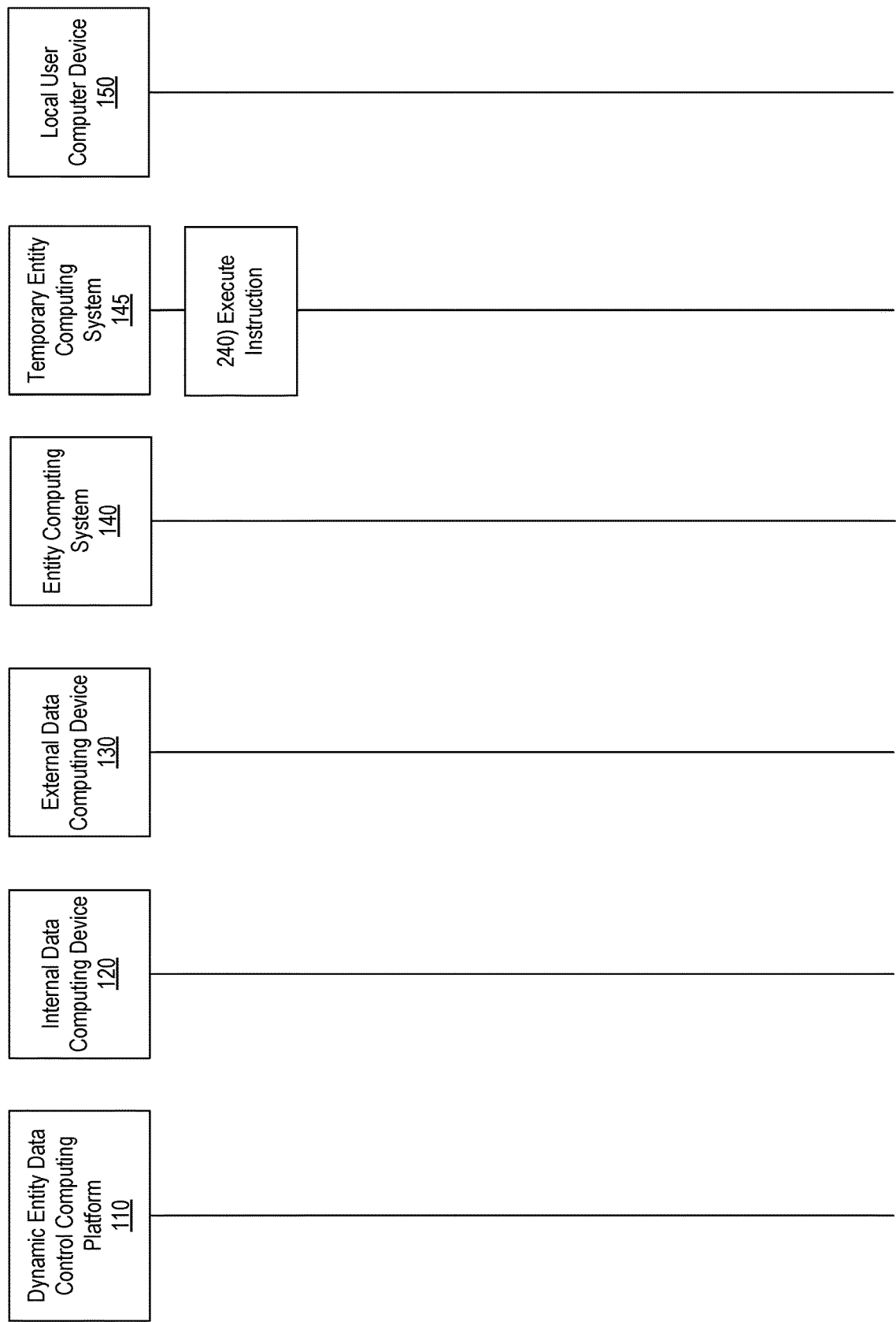

With reference to FIG. 2H, at step 240, the instruction may be received and executed.

Figure 3:
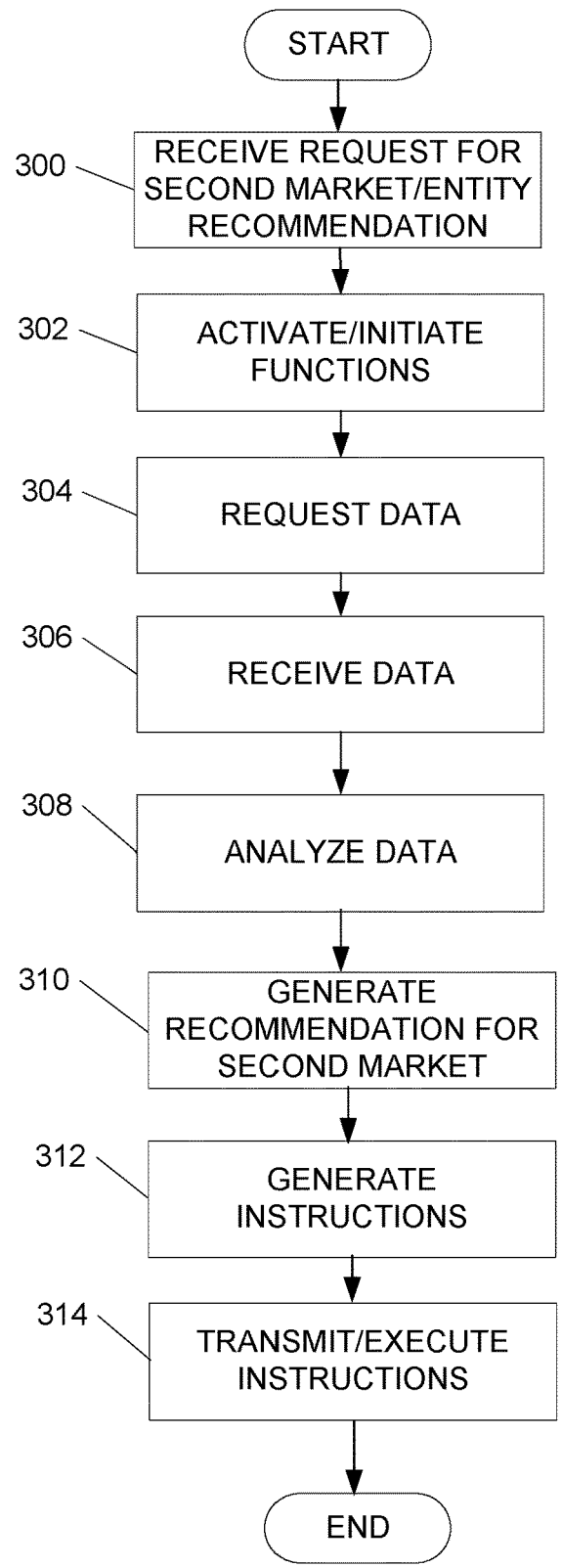
FIG. 3 depicts an illustrative method for implementing and using a system to perform dynamic entity data control functions, according to one or more aspects described herein.

FIG. 3 is a flow chart illustrating one example method of providing dynamic entity data control functions according to one or more aspects described herein. The processes illustrated in FIG. 3 are merely some example processes and functions. The steps shown may be performed in a different order, more steps may be added, or one or more steps may be omitted without departing from the invention.

At step 300, a request for a second market/entity recommendation may be received. For instance, a request for a recommendation for a second market and/or second entity operating in the second market in which an entity may operate for, in some examples, a temporary period may be received. The request may include additional information, such as length of time for operating in the second market, any limitations (e.g., geographic preferences), and the like.

The request may be received by the dynamic entity data computing platform 110 and from an internal data computing device 150.

At step 302, in response to receiving the request, the dynamic entity data control computing platform 110 may initiate and/or activate one or more second market/entity functions.

At step 304, the dynamic entity data control computing platform 110 may generate and transmit one or more requests for additional data. As discussed above, the one or more requests for additional data may be transmitted to an internal data computing device 120 and/or an external data computing device 130. In some examples, requested data may include data associated with particular products or services, information about a plurality of markets or regions, information about a plurality of entities operating in those markets or regions, and the like.

At step 306, the requested data may be received. At step 308, the received data may be analyzed using machine learning. At step 310, based on the analysis of the data performed using machine learning, a recommendation for at least one second market may be generated. At step 312, based on the analysis of the data performed using machine learning, a recommendation for a second entity operating in the at least one second market and available/capable of housing or accommodating the entity for the time period may be recommended.

At step 314, one or more instructions to initiate and/or facilitate operation of the entity via the second entity in the second market may be generated. As discussed herein, the one or more instructions may include modifications of existing data or systems to reflect the location of the entity at the second entity, to facilitate payroll processing, to facilitate inventory functions, to facilitate marketing functions, and the like.

At step 316, the generated one or more instructions may be transmitted to one or more computing systems (e.g., entity computing system 140, second or temporary entity computing system 145) and may be executed to modify data, add additional data, replace data, or the like.

FIGS. 4A and 4B illustrate example user interfaces in accordance with one or more aspects described herein. FIG. 4A includes a first user interface 400. The user interface 400 may include a portion of a website of an entity. As shown in FIG. 4A, the location 402 of the entity is given at a first address. Based on the contact information provided in FIG. 4A, the entity is operating at a single location 402. In some examples, that location information may be displayed based on a first instruction generated by the dynamic entity data control computing platform 110 and executed by the internal computing system 140.

FIG. 4B includes interface 450 which indicates the entity is located at a first location 452 and a second location 454. In some examples, the second location 454 may be a brick and mortar location of the identified or recommended second entity and the entity may be operating through the second entity for a temporary time period. However, to a user viewing the website, the information is seamless and appears as though the entity has 2 locations, without identifying the second entity in any way. In some examples, the two locations 452 and 454 may be displayed based on a second instruction generated by the dynamic entity data control computing platform 110 and executed by the entity computing system 140. As shown in FIG. 4B, the second instruction may be executed while the first instruction is being executed (e.g., the first instruction may include first location information 452 and the second instruction may include second location information 454 and the second location information 454 may be displayed simultaneously with the first location information 452).

As discussed herein, the arrangements described provide for using machine learning to generate recommendations for a second market for an entity to operate, as well as a second entity to facilitate or support the operations of the entity in the second market. The systems described herein may generate one or more instructions to modify data in order to use the resources of the second entity to provide the functions of the first entity, to publicize or display location data, logo data, and the like, of the first entity at the second location (e.g., in the second market), and the like.

In one example, Company A is a small start-up company providing landscaping services in the southeast. Company A operates regionally and has been successful throughout the area. Company A is interested in expanding into the northeast where they would provide landscaping services on a seasonal basis (e.g., from, for example, April through November). However, because of the short operating season in the northeast, and the costs and time associated with setting up a second location in the northeast, Company A is not sure whether it is worth the risk associates with branching out. Accordingly, Company A applies aspects of the arrangements described herein to generate a recommendation for a second market in which to operate for a temporary time period (e.g., April to November). In some examples, the second market may be a city within the northeast. The recommendation may be generated using machine learning and may be based, at least in part, on Company A identifying the northeast as a target region.

The systems may then generate a recommendation for a second entity to house the entity in the second market. For instance, the system may generate a recommendation that Company B, currently operating in City B in the northeast, should house Company A for the temporary time period. Accordingly, Company A may engage with Company B and instructions may generated to modify the website of Company A to reflect the additional location in City B (e.g., by using the address of Company B as a location of Company A), generating signage for display at Company B, modifying payroll of Company B to accommodate Company A, using equipment and resources of Company B to facilitate operations of Company A, generate training programs for the employees of Company B who may be operating as employees of Company A during the temporary time period, and the like. Further, metadata and other data may be modified so that users searching on the internet for Company A may find both locations (e.g., a mapping application may display a location of Company A in both the southeast at their first location and at an address of Company B, the second, temporary location).

In some examples, data control aspects may be employed to ensure that any sensitive data is secure and sensitive data associated with Company B is not shared or distributed to employees of Company A, and vice versa. Accordingly, data sharing between the companies may occur (e.g., marketing data, pricing data, competitive data, and the like), but controls may be executed to ensure that sensitive or private information is not shared between the companies or accessible to employees of the other entity. In some arrangements, data may be compartmentalized or segmented and/or filtered to control data to which users from each company have access.

After the expiration of the temporary time period (e.g., at the end of November), Company A may disengage from Company B and instructions may be generated to modify data to return it to a state before the engagement between the companies.

Accordingly, the arrangements described herein enable companies to operate dynamically in multiple locations or markets with minimal time and resources needed to establish a location or base of operations in the new market or markets.

In another example, Company 1 may provide emergency relief services in City 1. Upon learning of an impending natural disaster (e.g., hurricane, severe winter storm, or the like) in City 2, Company 1 may use the systems and arrangements described herein to generate a recommendation for a second entity, Company 2, operating in City 2, that may be used to temporarily house Company 1 (e.g., while the emergency relief services are needed). Accordingly, Company 1 may engage with Company 2 to provide an actual physical presence for Company 1 without Company 1 relocating, purchasing or leasing physical space, purchasing and setting up equipment and systems, hiring employees, and the like. In some examples, the system may continuously monitor, in real-time or near real-time, weather conditions and the like, to predict or identify a second location into which Company 1 should expand for the temporary time period. Similar to the examples provided above, upon expiration of the time period, the system may generate and execute instructions to disengage Company 1 from Company 2 and return data, systems, and the like, to a previous state.

In yet another example, artificial intelligence and/or machine learning may be used to proactively monitor and/or identify potential markets. For instance, Business A may operate in Location A while Business B, providing similar goods or services in Location B, may see market growth. In order to accommodate that growth, Business A may engage with Business B. In some examples, machine learning may be used to proactively identify the growth or potential grown in Location B and the system may automatically begin steps for engaging with the other business and/or restructure a trajectory of one or more of the businesses to match the growth.

The above-described examples are merely some example arrangements in which the systems described herein may be used. Various other arrangements employing aspects described herein may be used without departing from the invention.

Figure 5:
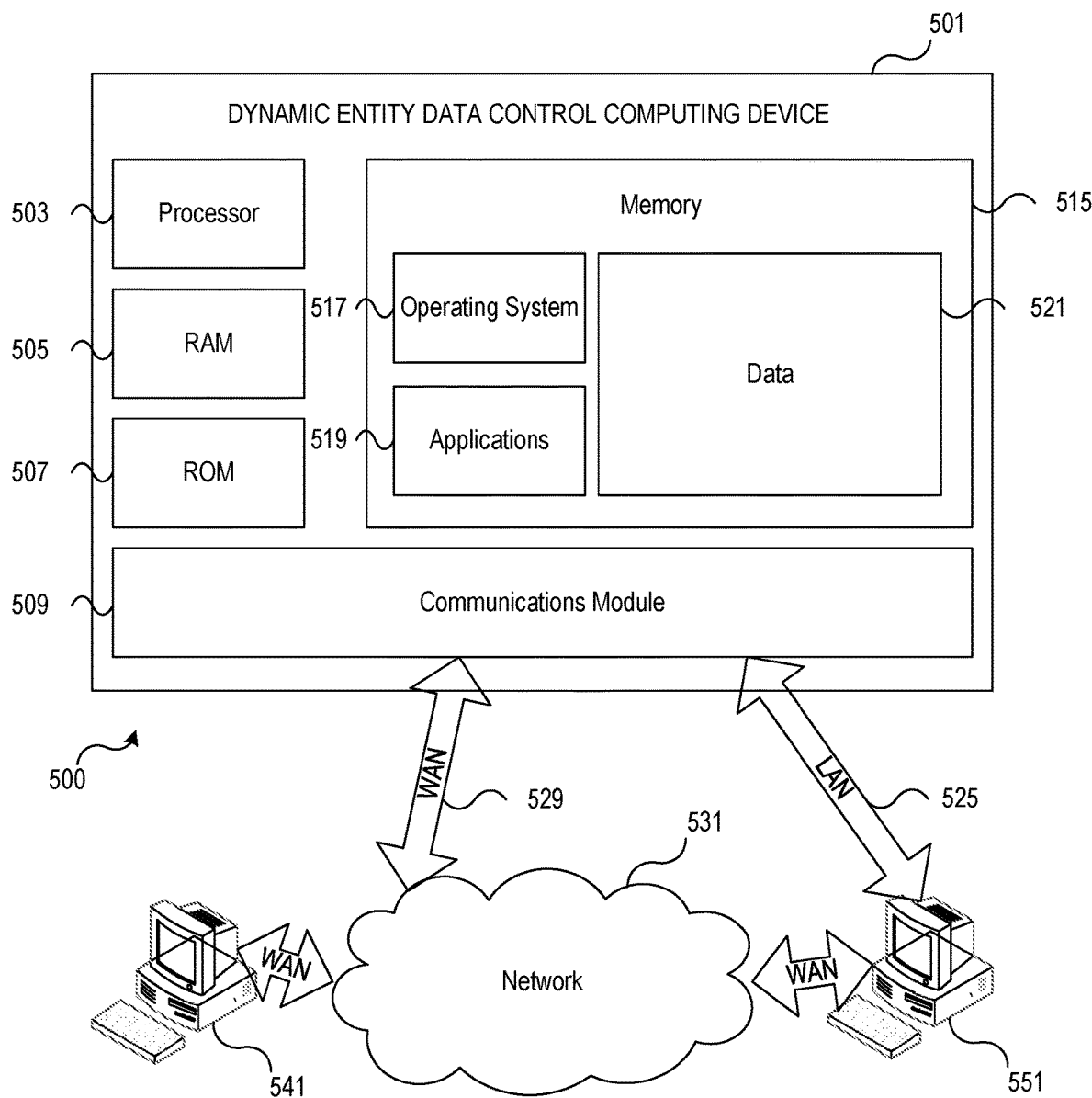
FIG. 5 illustrates one example operating environment in which various aspects of the disclosure may be implemented in accordance with one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include dynamic entity data control computing device 501 having processor 503 for controlling overall operation of dynamic entity data control computing device 501 and its associated components, including Random Access Memory (RAM) 505, Read-Only Memory (ROM) 507, communications module 509, and memory 515. Dynamic entity data control computing device 501 may include a variety of computer readable media. Computer readable media may be any available media that may be accessed by dynamic entity data control computing device 501, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on dynamic entity data control computing device 501. Such a processor may execute computer-executable instructions stored on a computer-readable medium.

Software may be stored within memory 515 and/or storage to provide instructions to processor 503 for enabling dynamic entity data control computing device 501 to perform various functions as discussed herein. For example, memory 515 may store software used by dynamic entity data control computing device 501, such as operating system 517, application programs 519, and associated database 521. Also, some or all of the computer executable instructions for dynamic entity data control computing device 501 may be embodied in hardware or firmware. Although not shown, RAM 505 may include one or more applications representing the application data stored in RAM 505 while dynamic entity data control computing device 501 is on and corresponding software applications (e.g., software tasks) are running on dynamic entity data control computing device 501.

Communications module 509 may include a microphone, keypad, touch screen, and/or stylus through which a user of dynamic entity data control computing device 501 may provide input, and may also include one or more of a speaker for providing audio output and a video display device for providing textual, audiovisual and/or graphical output. Computing system environment 500 may also include optical scanners (not shown).

Dynamic entity data control computing device 501 may operate in a networked environment supporting connections to one or more remote computing devices, such as computing devices 541 and 551. Computing devices 541 and 551 may be personal computing devices or servers that include any or all of the elements described above relative to dynamic entity data control computing device 501.

The network connections depicted in FIG. 5 may include Local Area Network (LAN) 525 and Wide Area Network (WAN) 529, as well as other networks. When used in a LAN networking environment, dynamic entity data control computing device 501 may be connected to LAN 525 through a network interface or adapter in communications module 509. When used in a WAN networking environment, dynamic entity data control computing device 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like and are configured to perform the functions described herein.

Figure 6:
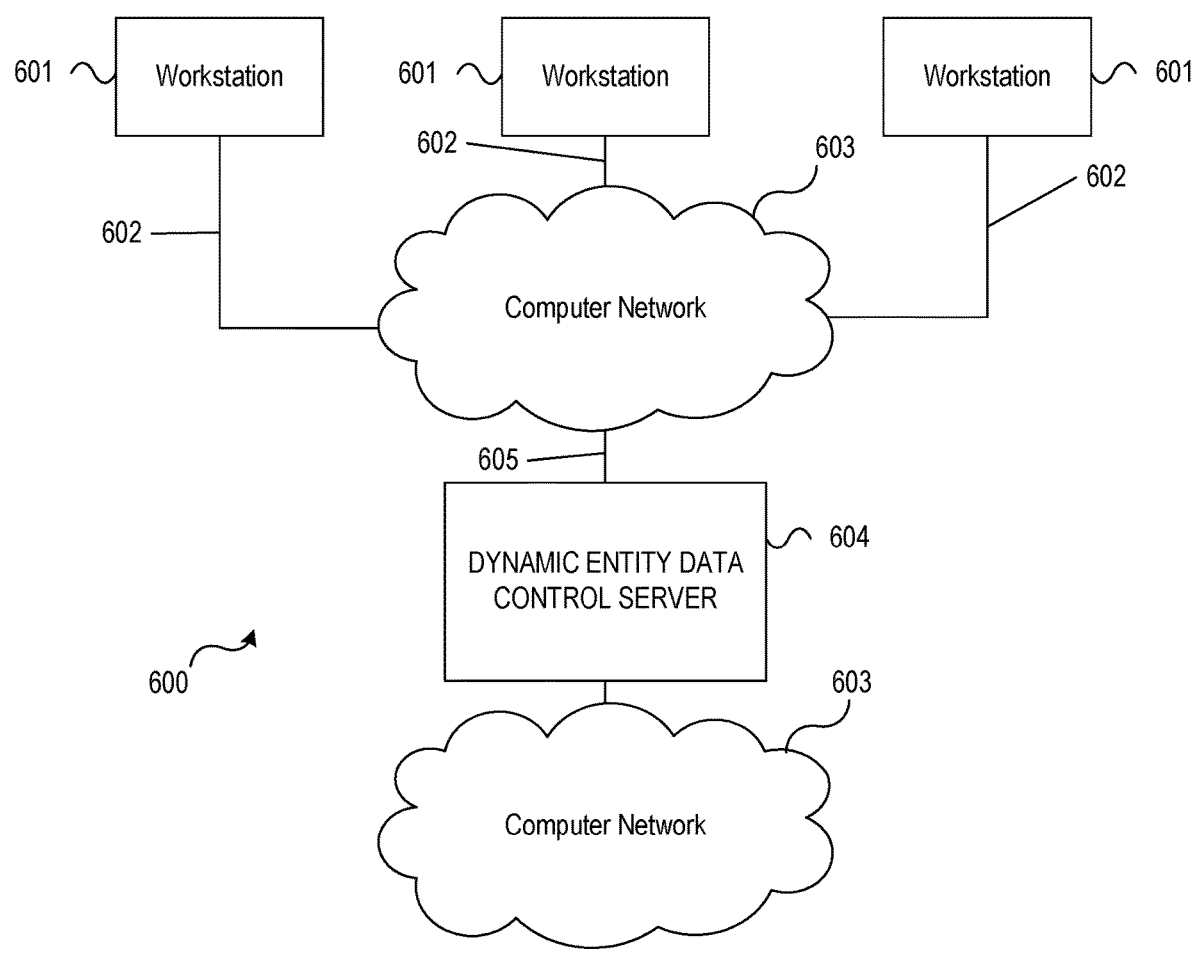
FIG. 6 depicts an illustrative block diagram of workstations and servers that may be used to implement the processes and functions of certain aspects of the present disclosure in accordance with one or more aspects described herein.

FIG. 6 depicts an illustrative block diagram of workstations and servers that may be used to implement the processes and functions of certain aspects of the present disclosure in accordance with one or more example embodiments. Referring to FIG. 6, illustrative system 600 may be used for implementing example embodiments according to the present disclosure. As illustrated, system 600 may include one or more workstation computers 601. Workstation 601 may be, for example, a desktop computer, a smartphone, a wireless device, a tablet computer, a laptop computer, and the like, configured to perform various processes described herein. Workstations 601 may be local or remote, and may be connected by one of communications links 602 to computer network 603 that is linked via communications link 605 to dynamic entity data control server 704. In system 600, dynamic entity data control server 604 may be a server, processor, computer, or data processing device, or combination of the same, configured to perform the functions and/or processes described herein. Server 604 may be used to receive requests, generate requests for data, receive and analyze response data, generate recommendations for entities or markets, generate instructions, and the like.

Computer network 603 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 602 and 605 may be communications links suitable for communicating between workstations 601 and dynamic entity data control server 604, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   generate one or more machine learning datasets based on analyzed, previously received data;
   execute at least a first instruction related to a first entity operating in a first market, executing the at least a first instruction including generating and displaying a website of the first entity including a first location of the first entity in the first market;
   receive a request for a recommendation for at least one of: a second market and a second entity in which the first entity may operate for a temporary time period;
   responsive to receiving the request for a recommendation, activating market or entity recommendation functionality including activating previously disabled functionality;
   receive additional data related to a plurality of markets and a plurality of entities;
   analyze, using one or more machine learning datasets including machine learning data linking one or more entity characteristics to one or more markets, the received additional data to generate the recommendation for the at least one of: the second market and the second entity;
   generate at least a second instruction related to the at least one of: the second market and the second entity;
   execute the generated at least a second instruction related to the at least one of: the second market and the second entity, executing the generated at least a second instruction including engaging with the second entity and modifying the website, modifying the website including adding a second location of the first entity at the second entity and modify metadata associated with the website, modifying the metadata including modifying location data of the first entity based on the second location, and engaging with the second entity to share data between systems of the first entity and the second entity, engaging with the second entity including segmenting data of the first entity and sharing a portion of the segmented data with the second entity;
   display the modified website including simultaneously displaying the first location of the first entity and the second location of the first entity;
   continuously scan to determine whether a predetermined time period for engaging with the second entity has expired;
   responsive to determining that the predetermined time period has not expired, continue to scan;
   responsive to determining that the predetermined time period has expired, disengage from the second entity including executing an instruction to further modify the website to revert back to previously displayed data; and
   update and validate the one or more machine learning datasets for subsequent use.

2. The computing platform of claim 1, wherein receiving the additional data further includes instructions that, when executed, cause the computing platform to:
   generate a request for the additional data;

transmit the request for additional data to at least one of: an internal computing system and an external computing system; and
responsive to the transmitted request, receive additional data response data from the at least one of: the internal computing system and the external computing system.

3. The computing platform of claim 2, wherein the request for additional data includes a request for performance data of the first entity.

4. The computing platform of claim 2, wherein the request for additional data includes a request for performance data associated with the plurality of entities and the plurality of markets.

5. The computing platform of claim 1, wherein executing the at least a first instruction further includes causing data related to an address of the first entity in the first market to be displayed on the website of the first entity.

6. The computing platform of claim 1, wherein displaying the modified website further includes causing data related to an address of the second entity to be displayed on the website of the first entity.

7. The computing platform of claim 1, wherein the at least a second instruction includes an instruction to modify a payroll system of the at least a second entity.

8. A method, comprising:
at a computing platform comprising at least one processor, memory, and a communication interface:
generating, by the at least one processor, one or more machine learning datasets based on analyzed, previously received data;
executing, by the at least one processor, at least a first instruction related to a first entity operating in a first market, executing the at least a first instruction including generating and displaying a website of the first entity including a first location of the first entity in the first market;
receiving, by the at least one processor and via the communication interface, a request for a recommendation for at least one of: a second market and a second entity in which the first entity may operate for a temporary time period;
responsive to receiving the request for a recommendation, activating, by the at least one processor, market or entity recommendation functionality including activating previously disabled functionality;
receiving, by the at least one processor and via the communication interface, additional data related to a plurality of markets and a plurality of entities;
analyzing, by the at least one processor and using one or more machine learning datasets including machine learning data linking one or more entity characteristics to one or more markets, the received additional data to generate the recommendation for the at least one of: the second market and the second entity;
generating, by the at least one processor, at least a second instruction related to the at least one of: the second market and the second entity;
executing, by the at least one processor, the generated at least a second instruction related to the at least one of: the second market and the second entity, executing the generated at least a second instruction including engaging with the second entity and modifying the website, modifying the website including adding a second location of the first entity at the second entity and modifying metadata associated with the website, modifying the metadata including modifying location data of the first entity based on the second location, and engaging with the second entity to share data between systems of the first entity and the second entity, engaging with the second entity including segmenting data of the first entity and sharing a portion of the segmented data with the second entity; and
displaying, by the at least one processor, the modified website including simultaneously displaying the first location of the first entity and the second location of the first entity;
continuously scanning to determine whether a predetermined time period for engaging with the second entity has expired;
responsive to determining that the predetermined time period has not expired, continue scanning;
responsive to determining that the predetermined time period has expired, disengaging from the second entity including executing an instruction to further modify the website to revert back to previously displayed data; and
updating and validating the one or more machine learning datasets for subsequent use.

9. The method of claim 8, wherein receiving the additional data further includes:
generating, by the at least one processor, a request for the additional data;
transmitting, by the at least one processor and via the communication interface, the request for additional data to at least one of: an internal computing system and an external computing system; and
responsive to the transmitted request, receiving, by the at least one processor, additional data response data from the at least one of: the internal computing system and the external computing system.

10. The method of claim 9, wherein the request for additional data includes a request for performance data of the first entity.

11. The method of claim 9, wherein the request for additional data includes a request for performance data associated with the plurality of entities and the plurality of markets.

12. The method of claim 8, wherein executing the at least a first instruction further includes causing data related to an address of the first entity in the first market to be displayed on the website of the first entity.

13. The method of claim 8, wherein displaying the modified website further includes causing data related to an address of the second entity to be displayed on the website of the first entity.

14. The method of claim 8, wherein the at least a second instruction includes an instruction to modify a payroll system of the at least a second entity.

15. One or more non-transitory computer-readable media storing instructions that, when executed by a computing platform comprising at least one processor, memory, and a communication interface, cause the computing platform to:
generate one or more machine learning datasets based on analyzed, previously received data;
execute at least a first instruction related to a first entity operating in a first market, executing the at least a first instruction including generating and displaying a website of the first entity including a first location of the first entity in the first market;
receive a request for a recommendation for at least one of: a second market and a second entity in which the first entity may operate for a temporary time period;

responsive to receiving the request for a recommendation, activating market or entity recommendation functionality including activating previously disabled functionality;

receive additional data related to a plurality of markets and a plurality of entities;

analyze, using one or more machine learning datasets including machine learning data linking one or more entity characteristics to one or more markets, the received additional data to generate the recommendation for the at least one of: the second market and the second entity;

generate at least a second instruction related to the at least one of: the second market and the second entity;

execute the generated at least a second instruction related to the at least one of: the second market and the second entity, executing the generated at least a second instruction including engaging with the second entity and modifying the website, modifying the website including adding a second location of the first entity in the at least one of: the second market or at the second entity and modify metadata associated with the website, modifying the metadata including modifying location data of the first entity based on the second location, and engaging with the second entity to share data between systems of the first entity and the second entity, engaging with the second entity including segmenting data of the first entity and sharing a portion of the segmented data with the second entity;

display the modified website including simultaneously displaying the first location of the first entity and the second location of the first entity;

continuously scan to determine whether a predetermined time period for engaging with the second entity has expired;

responsive to determining that the predetermined time period has not expired, continue to scan;

responsive to determining that the predetermined time period has expired, disengage from the second entity including executing an instruction to further modify the website to revert back to previously displayed data; and update and validate the one or more machine learning datasets for subsequent use.

16. The one or more non-transitory computer-readable media of claim 15, wherein receiving the additional data further includes instructions that, when executed, cause the computing platform to:

generate a request for the additional data;

transmit the request for additional data to at least one of: an internal computing system and an external computing system; and responsive to the transmitted request, receive additional data response data from the at least one of: the internal computing system and the external computing system.

17. The one or more non-transitory computer-readable media of claim 16, wherein the request for additional data includes a request for performance data of the first entity.

18. The one or more non-transitory computer-readable media of claim 16, wherein the request for additional data includes a request for performance data associated with the plurality of entities and the plurality of markets.

19. The one or more non-transitory computer-readable media of claim 15, wherein executing the at least a first instruction further includes causing data related to an address of the first entity in the first market to be displayed on the website of the first entity.

20. The one or more non-transitory computer-readable media of claim 15, wherein modifying the website further includes causing data related to an address of the second entity to be displayed on the website of the first entity.

21. The one or more non-transitory computer-readable media of claim 15, wherein the at least a second instruction includes an instruction to modify a payroll system of the at least a second entity.

* * * * *